United States Patent [19]

Murch et al.

[11] Patent Number: 5,500,048
[45] Date of Patent: *Mar. 19, 1996

[54] CLEANING METHODS AND COMPOSITIONS FOR PRODUCE

[75] Inventors: Bruce P. Murch, Cincinnati; Brian J. Roselle, Fairfield; Kyle D. Jones, West Chester, all of Ohio

[73] Assignee: The Procter & Gamble Company, Cincinnati, Ohio

[*] Notice: The term of this patent shall not extend beyond the expiration date of Pat. No. 5,498,295.

[21] Appl. No.: 270,696

[22] Filed: Jul. 5, 1994

[51] Int. Cl.$^6$ .................................................. B08B 9/20
[52] U.S. Cl. ............................... 134/6; 134/25.1; 134/40; 134/25.3
[58] Field of Search ................................. 134/25.1, 25.3, 134/29, 28, 6; 252/160, 170

[56] References Cited

U.S. PATENT DOCUMENTS

| | | | |
|---|---|---|---|
| 4,002,579 | 1/1977 | Mizutani et al. | 252/544 |
| 4,140,649 | 2/1979 | Bossert et al. | 252/105 |
| 4,177,294 | 12/1979 | Lehmann et al. | 426/271 |
| 4,244,975 | 1/1981 | Herbst et al. | 426/271 |
| 4,259,216 | 3/1981 | Miyajima et al. | 252/545 |
| 4,287,102 | 9/1981 | Miyajima et al. | 252/547 |
| 4,414,128 | 11/1983 | Goffinet | 252/111 |
| 4,808,330 | 2/1989 | Chung | 252/170 |
| 5,075,026 | 12/1991 | Loth et al. | 252/122 |
| 5,190,747 | 3/1993 | Sekiguchi et al. | 424/56 |
| 5,280,042 | 1/1994 | Lopes . | |
| 5,306,444 | 4/1994 | Kitamura et al. | 252/546 |
| 5,320,772 | 6/1994 | Tricca | 252/160 |
| 5,342,630 | 8/1994 | Jones | 424/717 |
| 5,366,995 | 11/1994 | Savage et al. | 514/558 |

FOREIGN PATENT DOCUMENTS

| | | |
|---|---|---|
| 4023418A1 | 2/1992 | Germany . |
| 05262617A | 3/1992 | Japan . |

OTHER PUBLICATIONS

Webster's Seventh New Collegiate Dictionary, G. & C. Merriam Company 1969, p. 154.

Code of Federal Regulations, Food and Drugs, § 173.315, "Chemicals used in washing or to assist in the lye peeling of fruits and vegetables".

Primary Examiner—Jan H. Silbaugh
Assistant Examiner—Robin S. Gray
Attorney, Agent, or Firm—Robert B. Aylor; Jerry J. Yetter; Jacobus C. Rasser

[57] ABSTRACT

Basic cleaning compositions using toxicologically-acceptable ingredients for cleaning fruits and vegetables are provided. Clear liquid formulations comprising oleate, alcohol ethoxylates and buffers are sprayed onto apples, lettuce and the like to remove soil and unwanted deposits.

10 Claims, No Drawings

CLEANING METHODS AND COMPOSITIONS FOR PRODUCE

TECHNICAL FIELD

The present invention relates to methods for removing dirt and other unwanted residues from produce, e.g., fruits and vegetables, which is intended for ingestion by humans or lower animals and to detersive compositions, especially in liquid form, which are especially suitable practicing said methods.

BACKGROUND OF THE INVENTION

It is well-known and appreciated by consumers that fruits and vegetables should be thoroughly washed prior to ingestion in order to remove soils and other unwanted residues which may be undesirably clinging to the surfaces thereof. In addition, some consumers wish to remove the artificial "waxy" coatings which may is be applied to some fruits to retard moisture loss for increased storage life and to enhance their appearance. It has been estimated that 95% of consumers recognize the need for thorough washing but, ordinarily, only use tap water for this purpose. On the order of 5% of those consumers who do wash their vegetables use a household cleaner, typically a liquid dishwashing product, to help ensure cleanliness. However, dishwashing products are not specifically intended for such use, inasmuch as they are usually designed to provide high, persistent suds which makes them inconvenient to remove from the fruits or vegetables which have been washed therewith. It will also be appreciated that the formulation of truly effective compositions, especially those which can be used safely by individual consumers, for washing fruits and vegetables presents a unique problem to the formulator, inasmuch as many art-disclosed cleaning ingredients .would, presumably, not be desirable for use in direct contact with foods where they might not be fully removed.

Moreover, it would be especially desirable to provide effective, toxicologically-acceptable cleaning compositions for fruits and vegetables in the form of substantially low-sudsing liquid solutions which are clear or which have only minimal haziness. Liquid solutions are convenient for the user, since they can be applied directly to soiled fruits and vegetables, followed by rinsing in tap water. The clarity of the liquids connotes cleanliness to the user and is thus highly desirable. Low sudsing is an important attribute so that removal of the solution by rinsing is achieved quickly and easily. It would also be of advantage if such compositions could be provided in the from of concentrates, which could be diluted by the consumer before use and/or applied to the fruits and vegetables as a direct spray-on.

Unfortunately, many toxicologically-acceptable cleaning ingredients do not meet the aforesaid requirements for clear, low-sudsing, dilutable liquid products. Many detersive surfactants form cloudy or even opaque suspensions in water. Of course, many surfactants are specifically designed to be high sudsing. Still others form relatively intractable phases in their concentrated form.

It has now been discovered that certain nonionic surfactants, properly formulated with oleic acid or water-soluble oleate or laurate salts and other ingredients can provide liquid compositions having the desired properties described above. It has been discovered that preferred compositions can be formulated in the acid pH range and have a desirable clean, "non-soapy" feel to the users' hands. Alternatively, certain compositions can be formulated in the basic pH range. Even when such basic compositions do have a soapy feel, they are preferred over the acidic compositions herein for removing artificial waxy coatings, especially from fruit such as apples. However, the invention also comprises basic compositions having less soapy feel.

BACKGROUND ART

The use and selection of cleaning ingredients for the purpose of washing fruits and vegetables is described by the United States Code of Federal Regulations, Title 21, Section 173.315: "Ingredients for use in washing or lye peeling of fruits and vegetables". These regulations restrict the ingredients that may be used for direct contact with food to those described as "generally regarded as safe" (GRAS), and a few other selected ingredients. These sections also provide certain limitations on the amount of material that can be used in a given context.

Among these ingredients, the experienced formulator will find only a few ingredients which can provide effective cleaning of hydrophobic residues, such as waxes, oils, or man-made chemical residues such as pesticides. It is recognized these types of residues are removed most readily by surface active ingredients in water, or by organic solvents largely in the absence of water. Other types of soils, especially particulate insoluble soils that do not readily disperse in water, are effectively removed by surface active materials in water, especially when aided by complex anionic salts, such as citrates (polycarboxylates), or polyphosphate salts.

Within this limited group of ingredients the range of effective cleaning compositions well suited to the task of cleaning fruits and vegetables, especially as practiced by individual consumers, have not been previously described. It is desirable to formulate liquid compositions which are amenable to either direct application to produce, preferably by spray application, or could be provided in suitable concentrated form to allow convenient dilution in a bowl or sink of water for washing of produce by immersion. Further, it is desirable the compositions are low sudsing, and easily rinsed, without leaving residue. Preferred compositions should be mild to the hands, especially for direct application.

*Food Chemical News, Inc.*, 1991, p. 334.1, reports that PEG 200-9500 has been cleared under §178.3750 as a component in articles for use in contact with food (Fed. Register, Oct. 15, 1968). Nonetheless, for washing produce, polyethylene glycol should be affirmed as GRAS.

SUMMARY OF THE INVENTION

The present invention encompasses methods for cleaning produce, especially fruits and vegetables, (and compositions, as disclosed hereinafter, for practicing said methods) at either an acidic pH, or basic pH. The present invention comprises several aspects including:

I. A method fur cleaning produce comprising contacting the surfaces of said produce by direct application of an aqueous cleaning solution typically comprising:
  (a) from about 0.01% to about 15% of $C_8$–$C_{18}$ fatty acid, and preferably less than about one eighth of the amount of nonionic surfactant in an acidic product;
  (b) optionally, except that it is required when the pH is less than about 5.5, from about 0.1% to about 4% by weight of nonionic surfactant, especially ethoxylated/propoxylated adducts of aliphatic $C_{12\text{-}18}$ alcohols;
  (c) optionally, from about 0.1% to about 4% by weight of organic polycarboxylic acid, preferably citric acid;

(d) optionally, up to about 0.2% by weight of an acid-stable anionic surfactant such as the alkali or alkaline earth salts of dodecylbenzene sulfonate;

(e) optionally, a toxicologically-acceptable acidic buffer, other than said polycarboxylic acid and/or said fatty acid, sufficient to maintain the desired pH;

(f) optionally, a toxicologically-acceptable basic buffer such as potassium and/or sodium salts of carbonate and/or bicarbonate;

(g) optionally, a toxicologically-acceptable preservative; and (h) the balance comprising an aqueous carrier selected from water and, optionally, low molecular weight, toxicologically-acceptable organic solvent such as ethanol, glycerol, etc.;

wherein said aqueous solution has a pH either in the range of from about 2.5 to about 5.5, preferably about 4, or in the range of 9.5 or greater, and preferably employs potassium carbonate as buffer (f) to provide a pH of about 11, said composition preferably being essentially free of any material that is not toxicologically acceptable.

I(A) The inventions disclosed herein can preferably encompass a method for cleaning produce, e.g., fruits and vegetables, at an acidic pH comprising contacting the surfaces of said produce by direct application with an aqueous cleaning solution comprising:

(a) from about 0.1% to about 4% by weight of nonionic surfactant, preferably non-nitrogen containing nonionic detergent surfactant, especially ethoxylated/propoxylated adducts of aliphatic $C_{12-18}$ alcohols;

(b) from about 0.01% to about 0.4% by weight of oleic acid, the ratio of nonionic detergent surfactant to oleic acid being more than about 8:1;

(c) from about 0.1% to about 1.5% by weight of organic, preferably naturally derived, organic polycarboxylic acid, e.g., citric acid;

(d) optionally, a toxicologically-acceptable acidic buffer, especially potassium hydrogen citrate, sufficient to maintain the desired pH;

(e) optionally, up to about 0.2% by weight of an acid-stable anionic surfactant such as the alkali or alkaline earth salts of dodecylbenzene sulfonate;

(f) optionally, a toxicologically-acceptable preservative; and (g) the balance comprising an aqueous carrier;

wherein said aqueous solution has a pH in the range of from about 2.5 to about 5.5, preferably about 4.

I(B) The inventions disclosed herein can also preferably encompass a method for cleaning fruits and vegetables at a basic pH, comprising contacting the surfaces of said fruits and vegetables with an aqueous cleaning solution comprising:

(a) optionally, from about 0.1% to about 4% by weight of nonionic surfactant, especially ethoxylated/propoxylated adducts of aliphatic $C_{12-18}$ alcohols;

(b) from about 0.1% to about 15% by weight of a member selected from the group consisting of sodium or potassium oleate (preferred) or from about 0.5% to 10% by weight of sodium or potassium laurate;

(c) optionally, but preferably, from about 0.2% to about 4% by weight of potassium and/or sodium polycarboxylate, having detergent building capability and preferably being derived from natural sources, such as potassium and/or sodium citrate, as a dispersant for particulate soils;

(d) optionally, a toxicologically-acceptable basic buffer such as potassium carbonate; and (e) the balance comprising an aqueous carrier selected from water and water-ethanol;

wherein said aqueous cleaning solution has a pH of 9.5 or greater, and preferably employs carbonate salt, or salts, as butter (d) to provide a pH of about 11 to about 12.5.

I(C) The inventions herein can also encompass a more specific method for cleaning fruits and vegetables at a basic pH, preferably more than about 9.5, comprising contacting the surfaces of said fruits and vegetables with an aqueous cleaning solution comprising potassium oleate, preferably at a level of more than about 0.5%. Potassium oleate is mild, rinses well, has minimal odor, is effective in removing unwanted materials, especially wax, from apples, does not oversuds, and is very safe, even when the composition is misused and the vegetable, or fruit, etc., is not completely rinsed. Therefore, it is a uniquely preferred surfactant for use in cleaning food materials like vegetables and fruits. The potassium cation is much more useful than the sodium cation since the potassium oleate is quite soluble whereas the sodium oleate tends to form a less soluble soap, especially at low temperatures.

I(D) Another preferred, concentrated, alkaline method for cleaning produce comprises contacting the surfaces of produce with a cleaning solution containing from about 0.5% to about 15%, preferably from about 0.75% to about 8%, more preferably from about 1% to about 5%, detergent surfactant, preferably one that is GRAS, and more preferably said oleate surfactant said cleaning solution having a pH of from about 8 to about 12.5, preferably from about 9.5 to about 12.3, especially when the detergent surfactant is a soap such as the said oleate, more preferably from about 11 to about 12. Such compositions when used in an effective amount to clean apples coated with wax, will provide effective removal of the wax. Removal of wax from apples is one of the most difficult cleaning tasks and therefore is indicative of overall superior performance.

I(E) Yet another preferred variation in the above methods for cleaning produce involves placing said cleaning solutions in a spray container to provide a spray of said solution to distribute the said solution, or solutions, over the surfaces of the produce while utilizing only a minimum amount of the cleaning solution and minimizing the exposure of the remaining solution to the atmosphere, where the solution is more likely to be contaminated and/or exposed to oxygen, both of which tend to cause undesirable changes in the solutions from aesthetic and/or performance considerations. In such spray processes, there is only need for a relatively small amount of material in the package, and for individual consumer use, this is desirable, since some consumers will not be able to manipulate large weights. For consumer usage, typically, the container will contain no more than about two gallons (about four liters), especially when the container is a spray container, even one that has a tube that permits the spray device to be manipulated while the bulk container remains in place. Preferably such spray containers contain about one liter, or less, of cleaning solution.

II. The invention also encompasses acidic and basic cleaning compositions in both concentrated and dilute forms, especially adapted for practicing said methods. (In the following disclosure, the lower amounts of the specified ingredients denote the dilute forms of the compositions herein and the higher amounts denote the concentrated forms which are typically diluted by a factor of from about 2 to about 3.) Such compositions include the following.

II.(A) A composition for cleaning fruits and vegetables at an acidic pH, comprising:
 (a) from about 0.1% to about 7.5%, preferably from about 0.3% to about 4.5%, by weight of nonionic surfactant, as described above;
 (b) from about 0.01% to about 0.75%, preferably from about 0.1% to about 0.5%, by weight of oleic acid, the ratio of oleic acid to nonionic detergent surfactant being less than about 1:8;
 (c) from about 0.1% to about 7.5%, preferably from about 0.3% to about 4.5%, by weight of organic polycarboxylic acid, preferably citric acid;
 (d) optionally, a toxicologically-acceptable acidic buffer;
 (e) optionally, a toxicologically-acceptable preservative; and
 (f) the balance comprising an aqueous carrier;
wherein said composition has a pH in the range of from about 2.5 to about 5.5.

Preferably, the acidic compositions herein contain from about 0.5% to about 3.0% by weight of potassium citrate as the acidic butler (d) and have a pH of about 4. Optionally, such compositions can contain up to about 1%, preferably about 0.2%, by weight of an acid-stable anionic surfactant, as described above.

II.(B) A composition for cleaning fruits and vegetables at a basic pH, comprising:
 (a) optionally, from about 0.1% to about 4%, preferably about 0.3% to about 1.0%, by weight of nonionic surfactant as described above;
 (b) from about 0.1% to about 15%, preferably from about 1% to about 5%, by weight of a member selected from the group consisting of sodium or potassium oleate (preferred), sodium or potassium laurate, or mixtures thereof;
 (c) from about 0.2% to about 4% by weight of polycarboxylic acid salt, especially potassium hydrogen citrate;
 (d) optionally, a toxicologically-acceptable basic buffer; and
 (e) the balance comprising an aqueous carrier selected from water and water-ethanol;
wherein said composition has a pH of 9.5 or greater.

Preferably, the basic compositions herein contain from about 0.5% to about 1.5% by weight of potassium and/or sodium carbonate buffer and have a pH of about 11.5.

II.(C) Preferred compositions for use herein in a concentrated alkaline method contain from about 0.1% to about 15%, preferably from about 0.5% to about 8%, more preferably from about 1% to about 5%, detergent surfactant, preferably one that is GRAS, and have a pH of from about 8 to about 12.5, preferably from about 9 to about 12.3, more preferably from about 11 to about 12. Such compositions when used in an effective amount to clean apples coated with wax, will provide effective removal of the wax. Removal of wax from apples is one of the most difficult cleaning tasks and therefore is indicative of overall superior performance.

II.(D) The present invention also encompasses detersive compositions with an improved tactile impression which are especially adapted for cleaning fruits and vegetables, comprising:
 (a) at least about 0.1%, preferably from about 0.5% to about 8%, most preferably from about 1% to about 5%, by weight, of a $C_{12}$–$C_{18}$ fatty acid or salt thereof;
 (b) at least about 0.05%, preferably from about 0.1% to about 10%, most preferably from about 0.25% to about 3.0%, by weight, of a water-soluble polyethylene glycol having a molecular weight of about 200, or higher;
 (c) a water or water-ethanol fluid carrier, said composition having a basic pH. The balance of the composition can comprise various optional adjunct materials, pH-adjusting agents, perfumes or essences, preservatives and the like.

In a preferred mode, component (b) has a molecular weight in the range from about 400 to about 9500.

Typical compositions herein are wherein component (a) is potassium oleate, and wherein the weight ratio of (a):(b) is in the range from about 1:2 to about 15:1.

The compositions having improved tactile impression are typically formulated in the basic pH range, preferably from about pH 9.5 to about pH 12.3. Preferred compositions have a viscosity at room temperature of less than about 100 centipoise, preferably less than about 50 centipoise for sprayable compositions.

II.(E) Preferred compositions for use herein contain only materials that are GRAS to protect against possible misuse by the consumer. Traditionally, most suggestions for cleaning of fruits and/or vegetables have contemplated a commercial scale where there is typically more control over the conditions, especially the amount and thoroughness of rinsing. The present invention, especially the methods involving use of hand held trigger activated spray means are primarily/solely suitable for use by individual consumers so that it is essential that extra safety be built into the product. Failure to rinse thoroughly after cleaning is less of a concern if all of the ingredients are GRAS. This is especially important when concentrated basic compositions suitable for removal of wax from apples are used. The larger amounts of materials needed for removal of wax create an heretofore unknown level of risk for the individual consumers, many of whom are not likely to read, or follow, instructions which would permit safe use of non-GRAS materials.

The ingredients in the above compositions are preferably selected and used in proportions which provide substantially clear compositions. Substantially clear includes only minimal haziness, and preferably the compositions are completely clear. The ingredients are also selected to have minimal odor, both initially and after storage. The lack of odor is especially important in compositions for use on food. The compositions preferably have a viscosity that is more than about 10 centipoise, preferably more than about 50 centipoise when at rest, but thin under shear to permit easy dispensing, especially from spray containers.

Below pH about 9.7, the compositions can exhibit some objectionable fatty acid odor. Even at the optimal pH's above 11, some odor can persist. In order to mask this odor, the compositions can contain a perfume or essence ingredient. Especially preferred for this use are terpenes derived from citrus fruit, e.g., oranges, lemons, limes, grapefruits, tangerines, tangelos, etc.

All documents cited are incorporated herein by reference.

DETAILED DESCRIPTION OF THE INVENTION

The following toxicologically-acceptable ingredients are used in the preparation of the preferred compositions herein. By "toxicologically-acceptable" is meant that any residues from the ingredients of the compositions which may remain on the fruits or vegetables cleansed therewith are safe for ingestion by humans and lower animals.

Nonionic Surfactant—The nonionic surfactant is preferably selected from materials known well-known in the art, such as alkylene oxide (ethylene oxide or propylene oxide-)adducts of $C_{10-18}$ aliphatic alcohols or acids, $C_{10-18}$ aliphatic alcohol adducts of glucose (alkyl polyglucosides). The specific nonionic surfactant selected ideally has a hydrophilic-lipophilic balance (HLB) greater than about 10, and a cloud point above about 35° C. in the composition. The United States Code of Federal Regulations (CFR) specifically describes an ethylene oxide/propylene oxide adduct of $C_{12-18}$ aliphatic alcohol of molecular weight of about 800. Such a material is available as PLURAFAC RA-20 (BASF).

It is to be appreciated that in the acidic compositions herein, the alkoxylated alcohol functions substantially as a cleansing agent, whereas in the basic compositions the alkoxylated alcohol functions mainly as a dispersant for any soap curd which may form during the cleansing operation. Further, it is recognized that the selection of non-nitrogen containing nonionics can minimize the possibility of microbial growth in the dilute surfactant compositions.

Fatty Acid and/or Salts Thereof—The acidic compositions herein are formulated using an unsaturated fatty acid; oleic acid is preferred and convenient for this use. However, the particular oleic acid that is selected should preferably be low in polyunsaturates, e.g., contain less than about 10%, preferably less than about 7%, more preferably less than about 5% and will typically have an Iodine Value (IV) of from about 70 to about 100, preferably from about 83 to about 95, more preferably from about 85 to about 90. Polyunsaturated fatty acids are not preferred herein, due to odor problems. However, this is primarily from aesthetic considerations since such acids are effective in cleaning. The amount of polyunsaturated fatty acids should be less than about 8%, preferably 0%. The amount of polyunsaturated fatty acids with more than about two double bonds should be less than about 1%, preferably 0%. Saturated fatty acids are unacceptable as they have limited solubility for longer chainlength materials ($\geq C_{12}$), or have unacceptable odor ($\leq C_{14}$). For example, stearic and/or tallow fatty acids soaps, even potassium soaps, do not have enough solubility at room temperature where most produce cleaning is done by individual consumers, to formulate even compositions containing the minimum of about 0.1% soap required for acceptable cleaning. Other specific solubilizing surfactants in higher proportions would be required to solubilize these saturated fatty acids. Pamolyn 100 FGK oleic acid is a good example of a suitable commercial fatty acid.

For the acidic compositions, other low HLB (<6) nonionics can be substituted, such as monoglycerides, but these are less preferred than oleic acid. The purpose of these materials is to provide acceptable cleaning with low sudsing to the compositions. Preferably, in the acidic compositions the oleic acid is used in an amount that is less than about 1:8 (about 12%) by weight of the nonionic surfactant. For the basic compositions, sodium oleate or sodium laurate can be employed, but only sodium oleate is described as GRAS on the CFR. The fatty acid (or salt thereof) functions both to provide a cleansing action and to dampen sudsing. In the acidic formulation, the pH of very dilute mixtures is kept below 7.0 by citric acid to prevent formation of cloudiness.

Polyethylene Glycol—The water-soluble polyethylene glycol polymer (PEG) employed herein is the known article of commerce and is available under a variety of trade names, of which CARBOWAX (Union Carbide Corporation) is exemplary. PEG's in the average molecular weight range of from about 200 to about 20,000 can be used herein, and PEG as CARBOWAX in the average molecular weight range of at least about 400, typically 400 to about 9500, is convenient and preferred. As disclosed above, the compositions herein will comprise at least about 0.05%, by weight, of the PEG and will typically comprise from about 0.1% to about 10%, by weight, of PEG. The amounts used can vary with the molecular weight of the PEG, the amount of oleate or other fatty acid used in the composition, the desired viscosity of the composition, and like factors within the discretion of the formulator. The following Table 1 illustrates the variation in viscosity which can be effected using various levels of PEG and varying PEG molecular weights in a liquid composition (Control) comprising 3% potassium oleate. Table 1 also illustrates the effect of sodium benzoate (Bz) on viscosity.

TABLE 1

| Composition | Viscosity (cP* as made) 72° F. (22° C.) | Viscosity (cP* as made) 43° F. (6° C.) |
| --- | --- | --- |
| Control (no PEG) | 7 | 110 |
| Control + 0.674% Bz | 23 | 1000 |
| Control + 0.118% Bz | 7 | 159 |
| Control + 0.1% PEG 400 | 5 | 36 |
| Control + 0.5% PEG 400 | 2 | 17 |
| Control + 0.1% PEG 8000 | 5 | 23 |
| Control + 0.5% PEG 8000 | 8 | 4 |

*Viscosity in centipoise as measured using Brookfield LVTD #2 spindle, 60 rpm at the designated temperature.

In a typical mode, the preferred compositions herein that have an improved tactile impression will comprise oleate-:PEG weight ratios in the range from about 1:2 to about 15:1, preferably from about 1:1 to about 10:1.

Tactile Impression—The compositions herein which contain the polyethylene glycol are characterized not only by their excellent cleaning performance and sudsing/rinsability properties, but also by their improved viscosity properties and improved "feel". While, as disclosed above, the improved viscosities of the compositions herein are readily demonstrated quantitatively using standard measurement techniques, the improved feel of the compositions which come into contact with the users' hands is a qualitative tactile impression. However, this improved, "non-slippery", "non-soapy" improvement in skin feel can be demonstrated by rubbing Test (PEG-containing) and Control (no PEG) compositions on the hands or inner forearms of volunteer graders. Even in such rudimentary tests, the graders can readily distinguish the improved tactile impression of the compositions made in accordance with this invention.

Optional Surfactants—Optionally, acid or base stable anionic surfactants can be employed, as allowed by the United States Code of Federal Regulations, Title 21, Section 173.3 15. Preferred are salts of dodecylbenzene sulfonate, typically at levels up to 0.2%. Also described in the CFR are phosphate esters of ethylene and/or ethylene/propylene oxide adducts of aliphatic alcohols, dioctyl sulfosuccinate, or 2-ethylhexyl sulfate, typically but these materials suffer from lack of stability at either acid or basic conditions.

Sequestrant/builder—The organic polycarboxylic acid, or salt thereof, e.g., citric acid, is used as a sequestrant/builder in the acidic compositions herein or sodium and/or potassium citrate as used in the basic compositions herein are standard items of commerce. Other organic poly carboxylic acids, especially those that are GRAS, such as tartaric, malic, etc. acids, can also be used. When formulating the basic formulations herein, it is preferred to use tile potassium salt, as compared with the sodium salt, to provide ease of formulatability. Complex phosphates can also be used, but are generally avoided due to regulatory considerations.

Buffer—Toxicologically-acceptable acidic or basic buffers can be used in the compositions herein to maintain product pH in the acid or base range. For ease of formulatability, it is highly preferred that such acidic and basic buffers be in their potassium salt form. Citric acid is a preferred acid pH buffer, and in the basic pH systems, potassium citrate is a preferred dispersant for particulate soils. Potassium carbonate is a convenient and preferred basic pH buffer. Sodium bicarbonate is a highly desirable material to add to the compositions of this invention as a part of the buffering system since it is readily available as baking soda in food grade and is therefore relatively inexpensive, while providing a highly desirable purity to the composition. Compositions formulated with a mixture of potassium and sodium cations in molar ratios of from about 1:1 to about 10:1, preferably from about 2:1 to about 8:1, more preferably from about 4:1 to about 5:1 potassium to sodium, e.g., as provided by mixtures of potassium hydroxide (hydrate) and sodium bicarbonate, have desirable theological properties. The compositions are thick, so as to cling to the fruit or vegetable until spread, but are readily dispensed, e.g, by means of a spray device, either aerosol or finger-activated pump. The levels and identities of the ingredients are adjusted to provide products having the desired viscosities as set forth herein, e.g., more than about 5, preferably more than about 10, more preferably more than about 50 centipoise when at rest, and less than about 150, preferably less than about 100, more preferably less than about 50 centipoise under shear of $\geq -1000$ sec$^{-1}$.

The ability of the preferred compositions containing mixtures of both sodium and potassium cations to shear thin is important to promote easy dispensing, especially when the compositions are sprayed, while maintaining the ability to be thick, cling, and delay run off after being applied to the produce.

The pH is preferably not greater than about 12.5, and especially does not contain large amounts of butter at higher pHs for consumer safety, especially when the compositions are sprayed.

Preservative—The strategy of formulating the present compositions at either high or low pH is based on the reduced tendency for biological growth of contaminants, such as bacteria, fungi, or molds, at either high pH (>9) or low pH (<5). At neutral pH, an increased reliance on preservatives is required to insure the lack of biological growth through contamination in making or in use. The acidic compositions herein do preferably contain a minimal amount, typically from about 0.01% to about 0.2% by weight, of a toxicologically-acceptable preservative in order to prevent the growth of fungi, bacteria or like in the product on storage. Standard food-grade preservatives such as potassium sorbate/sorbic acid and/or sodium benzoate/benzoic acid, or mixtures thereof% are suitable for such purposes. For example, from about 0.01% to about 0.2% of benzoic acid or its sodium or potassium salts can be used. In general, the basic pH compositions herein do not require a preservative, although one can be added if desired.

Antioxidants The use of commercial oleic acid, or oleate salts, can be complicated by development of oil-odors and/or yellowing of the compositions in which they appear. These undesirable properties are believed to be caused by complex side reactions initiated by the reaction of oxygen with primarily the polyunsaturated components of the fatty acid stock. These results can be avoided, or minimized, by avoiding contact with air, or by controlling the quality of the fatty acid stock so that the amount and type of polyunsaturates are minimized as described above, and/or by the addition of antioxidants.

It has been found, that the addition of tocopherols (e.g., Vitamin E, or tocopherol acetates) in alkaline formulations is advantageous, as they do not degrade, nor do they impart a strong color. They inhibit the development of off-odors for extended periods of time so that the need for masking scents is minimized, or eliminated, particularly for oleic acid stocks of high quality, as described above. The use of butylated phenols, such as BHT and BHA is also useful, but their effectiveness appears more limited and they can impart stronger colors to the compositions. Other food grade antioxidants such as Vitamin C and sulfites, are desirable to prevent deterioration of tile compositions by tile action of oxygen, but care must be taken since vitamin C can suffer color degradation and sulfites can cause odor problems. Sulfites also have been tile target of potential health concerns. In acidic formulations, vitamin C can be advantageous since its color degradation is less severe.

Fluid Carrier—The major proportion (typically, 90%–98%, by weight) of the compositions herein comprises water as the solubilizing carrier for the ingredients. As noted in the Examples hereinafter, water-ethanol can also be employed and is especially preferred when formulating basic pH compositions herein. The ethanol level preferably should not exceed 2% in the solution used to clean the produce, to avoid an alcoholic odor, especially when spraying. Other compatible, water-soluble, low molecular weight solvents such as glycerol can also be used.

It has been discovered that for the acidic compositions (pH 5.5, and below) described herein, a unique non-slippery solution feel is imparted by the low pH compositions, especially at total levels of surfactant plus oleate below about 3%. Such characteristic appears to be unique to these compositions, compared to comparable compositions at neutral or high pH. This solution feel is preferred for ease of handling and easy rinsing.

The compositions herein are preferably used by placing them in a package comprising either an aerosol container or a non-aerosol spray device "spray means." Said spray means is any of the manually activated, preferably "trigger-type," means for producing a spray of liquid droplets as is known in the art. Typical spray means are disclosed in U.S. Pat. Nos.: U.S. Pat. No. 4,082,223, Nozawa, issued Apr. 4, 1978; U.S. Pat. No. 4,161,288, McKinney, issued Jul. 17, 1979; U.S. Pat. No. 4558,821, Tada et al., issued Dec. 17, 1985; U.S. Pat. No. 4,434,917, Saito et al., issued Mar. 6, 1984; and U.S. Pat. No. 4,819,835, Tasaki, issued Apr. 11, 1989, all of said patents being incorporated herein by reference. The spray bottle, or container can be any of the ones commonly used for containing hard surface cleaner detergent compositions. Examples of bottles are those in U.S. Design Pat. Nos.: U.S. Pat. No. Des. 244,991, Weekman et al., issued Jul. 12, 1977; and U.S. Pat. No. Des. 275,078, Wassergord et al., issued Aug. 14, 1984, said patents being incorporated herein by reference.

The spray means herein can also include those that incorporate a propellant gas into the liquid and those that will foam even detergent compositions having a viscosity of less than about 15 cps. The device can also be one that can be adjusted to either give a liquid spray or a foam. The spray means herein are typically those that act upon a discrete amount of the composition itself, typically by means of a piston that displaces the composition and expels the composition through a nozzle to create a spray of thin liquid.

Preferred articles include the compositions herein that are suitable for use in the processes described herein, in a package that can provide a spray. Such articles are not widely marketed. This is surprising in view of the clear advantages for such products for use by individual consumers. The typical use involves treating individual items of produce, which would make preparation of a "bath" wasteful.

In a preferred process for using the products described herein, and especially those formulated to be used at full strength, the product is sprayed onto the food lo product to be cleaned, rubbed, rinsed and/or wiped off with a suitable material like cloth, sponge, a paper towel, etc. Surprisingly, the compositions and processes described herein, especially those that are alkaline, can provide effective disinfectancy.

All parts, percentages, and ratios herein are "by weight" unless otherwise is stated. All number values are approximate unless otherwise stated.

The following Examples illustrate the compositions and processes of this invention, but are not intended to be limiting thereof. The exemplified basic liquid compositions can be prepared at pH 9.5–12.3 by dissolving the ingredients in water or water-ethanol using conventional mixing apparatus. In a convenient mode, water is placed in a mixing vessel. Potassium hydroxide, citric acid, the bicarbonate, glycerine (processing aid) and ethanol are added in the named sequence, with stirring. The oleic acid is added with high shear and stirring is continued. The PEG (which can conveniently be predispersed in water) is then added. The optional perfume ingredients can be added any time after the oleic acid has been dissolved in the mixture.

EXAMPLE I

A concentrated acidic cleaning composition is prepared by dissolving the following ingredients in water.

| Ingredient | % (wt.) |
| --- | --- |
| PLURAFAC RA-20 | 4.5 |
| Oleic acid | 0.25 |
| Citric acid | 2.0 |
| Potassium citrate | 2.0 |
| Potassium sorbate | 0.1 |
| Sodium benzoate | 0.1 |
| Water | Balance |
| Product pH 4 | |

In use, for example, the composition of Example I is diluted 3-fold with water and sprayed onto soiled fruits and vegetables such as apples, grapes, peaches, potatoes, lettuce, tomatoes, celery, and the like, with light scrubbing as may be required. After rinsing in tap water, the fruits and vegetables are cleansed and ready for use.

EXAMPLE II

A concentrated basic cleaning composition is as follows.

| Ingredient | % (wt.) |
| --- | --- |
| Sodium oleate | 3.0 |
| Potassium citrate | 1.5 |
| Potassium carbonate | 1.5 |
| PLURAFAC RA-20 | 1.0 |
| Ethanol | 2.0 |
| Water | Balance |
| Product pH 11.5 | |

The composition of Example II is prepared by adding oleic acid to ethanol or ethanol/water, neutralizing with NaOH, and then dissolving the resulting solution with the balance of the ingredients in water.

In use, for example, the composition of Example II is diluted 2-fold with water and sprayed onto soiled produce, e.g., fruits and vegetables such as apples, grapes, peaches, potatoes, lettuce, tomatoes, celery, and the like, with light scrubbing as may be required. After rinsing in tap water, the fruits and vegetables are cleansed and ready for use.

EXAMPLE III

Liquid compositions suitable for direct application to fruits and vegetables, including by spray-on, are as follows:

| Ingredient | % (wt.) Composition A | % (wt.) Composition B |
| --- | --- | --- |
| Oleic Acid | 2.64* | 1.32 |
| Ethanol | 2.0 | 2.0 |
| Glycerol | 2.0 | 2.0 |
| PEG (avg. mol. wt.) | 0.5 (4600) | 1.5 (8000) |
| KOH | 1.49 | 1.23 |
| KHCO$_3$ | 0.65 | 0.65 |
| Citric Acid | 0.63 | 0.63 |
| Oil Grapefruit Terpenes EX-5-fold | 0.04 | 0.02 |
| Water | Balance | Balance |

*Corresponds to 3% potassium oleate.

In-use, the compositions are applied through the commercial trigger-type spray device used with the commercial product CINCH® directly to soiled fruits and vegetables such as apples, grapes, peaches, potatoes, lettuce, tomatoes, celery, and the like, with light scrubbing as may be required. After rinsing in tap water, the fruits and vegetables are ready for use. The waxy materials commonly used to reduce water loss for extended storage life and to produce a sheen on apples can also be removed by application of the compositions. An advantage of the consumer cleaning produce is that materials serving a useful function, like wax on apples, are removed immediately before use so as to prolong their effect as long as possible.

If desired, the compositions of Example III can be concentrated up to about 5-fold by removal of a corresponding amount of water-ethanol solvent. The concentrates are preferably diluted back to correspond to 3%–5% potassium oleate prior to use in an immersion or spray-on cleaning operation.

What is claimed is:

1. A method for cleaning surfaces of produce selected from the group consisting of: fruits, vegetables, and mixtures thereof, so that said produce is ready for ingestion, comprising the step of contacting the surfaces of said produce with an aqueous cleaning solution having a basic pH of at least 9.5 and comprising at least 0.1% potassium oleate, and thereafter rinsing, wiping off, or rinsing and wiping off said solution from the surfaces of said produce to clean the surfaces of said produce.

2. The method of claim 1 wherein said solution contains from about 0.1% to about 4% by weight of said potassium oleate.

3. The method of claim 2 wherein said solution contains more than about 0.5% by weight of said potassium oleate.

4. The method of claim 1 wherein said solution has a pH of from about 11 to about 12.

5. The method of claim 1 wherein said solution contains less than about 8% by weight, based on the oleate, of polyunsaturates.

6. The method of claim 5 wherein said solution contains less than about 1% by weight, based on the oleate, of polyunsaturates with more than two unsaturation sites.

7. The method of claim 5 wherein said solution contains from about 0.001% to about 0.05% of an antioxidant.

8. The method of claim 1 wherein said solution contains less than about 1% by weight, based on the oleate, of polyunsaturates with more than two unsaturation sites.

9. The method of claim 1 wherein said solution contains from about 0.001% to about 0.05% of an antioxidant.

10. The method of claim 1 which is practiced by an individual consumer.

* * * * *